United States Patent [19]
Chaffardon et al.

[11] Patent Number: 6,029,701
[45] Date of Patent: Feb. 29, 2000

[54] QUICK-CONNECT COUPLING FOR PRESSURIZED FLUID LINES

[75] Inventors: Claude Chaffardon, Cranves Sales; Liana Hardy, Ville la Grand, both of France

[73] Assignee: Parker Hannifin SA, Annemasse Cedux, France

[21] Appl. No.: 09/036,442

[22] Filed: Mar. 6, 1998

Related U.S. Application Data

[63] Continuation of application No. PCT/FR96/01409, Sep. 12, 1996.

[30] Foreign Application Priority Data

Sep. 19, 1995 [FR] France .................................. 95 11174

[51] Int. Cl.⁷ .................................................. F16L 37/28
[52] U.S. Cl. ............................ 137/614.06; 251/149.9
[58] Field of Search ....................... 137/614.04, 614.06; 251/149.9

[56] References Cited

U.S. PATENT DOCUMENTS

| | | | |
|---|---|---|---|
| 3,474,827 | 10/1969 | Torres | 137/614.06 |
| 3,897,091 | 7/1975 | McMath et al. | 137/614.06 |
| 4,388,947 | 6/1983 | Steuerwald | 137/614.06 |
| 4,398,561 | 8/1983 | Maldavs | 137/614.05 |
| 4,664,148 | 5/1987 | Magnuson | 137/614.06 |
| 4,974,635 | 12/1990 | Hanus et al. | 137/614.05 |

FOREIGN PATENT DOCUMENTS

| | | |
|---|---|---|
| 0187238 | 7/1986 | European Pat. Off. . |
| 0265569 | 5/1988 | European Pat. Off. . |

*Primary Examiner*—A. Michael Chambers
*Attorney, Agent, or Firm*—Christopher H. Hunter

[57] ABSTRACT

A quick-connect coupling for pressurized fluid lines includes a male element and a female element whose connecting ends are each closed off by valves. Each valve comprises a sealing member which engages with the sealing member of the other valve during connection. A return spring pushes the sealing member against a seat and an abutment limits the opening stroke of the sealing member. The abutment of the element under pressure is fixed and positioned in such a way that the sealing member engages with the abutment when the male and female elements are connected. The other abutment is mounted in the other element in a sliding manner and includes first and second sliding sleeves. The front end of a second of the sleeves forms a valve sealing member and includes holes located directly behind the sealing member enabling fluid to flow through the body. The rear end of the second sleeve is shaped for engagement with a front end surface of a first of the sleeves. The coupling furthermore includes means for locking and returning the sliding abutment to the forward position, which permits the rearward movement of the sliding abutment during connection of the male and female elements and the locking of the sliding abutment into a forward position once such connection is complete.

5 Claims, 4 Drawing Sheets

ન,701

QUICK-CONNECT COUPLING FOR PRESSURIZED FLUID LINES

CROSS-REFERENCE TO RELATED APPLICATION

This application is a continuation of co-pending International Application No. PCT/FR96/01409 filed on Sep. 12, 1996 and which designated the United States.

BACKGROUND OF THE INVENTION

The present invention relates to quick-connect couplings for pressurized fluid lines.

In one known coupling, a sliding abutment element includes a sliding sleeve, located behind the valve, on which means for locking and returning the abutment to the forward position acts. Such sleeve has an external tubular part guided by the body of the element and an internal tubular part receiving a sliding guide rod which forms an integral part of the sealing member. The external and internal parts are interconnected by radial walls defining between them flow-through openings for the fluid. The abutment is formed either by the front end of the interior tubular part with which the rear face of the sealing member engages, or by a transverse wall located in the interior tubular part with which the end of the guide rod of the sealing member engages.

Such sliding sleeve has a complex structure which makes these couplings relatively difficult and costly to manufacture.

Installing the sleeve, sealing member and return spring within the body is also not easily accomplished because the guide rod of the sealing member can slip out of the internal tubular part.

Moreover, the fluid flow through such sleeve is disturbed by the radial arms and by the return spring of the sealing member, and the resistance to high pressures of such sleeve and valve is limited.

It is believed that there is a demand in the industry for a quick-connect coupling which overcomes at least some of these drawbacks.

SUMMARY OF THE INVENTION

The present invention provides a quick-connect coupling which is simple and inexpensive to manufacture and assemble, and which permits proper fluid flow and has good resistance to pressure. The present invention also provides a coupling which permits connection of fluid lines while pressurized fluid remains in one of the lines.

The coupling comprises a male element and a female element whose connecting ends are closed off by valves. Each valve comprises a sealing member which engages with the sealing member of the other valve when connected, a return spring pressing such sealing member against a seat, and an abutment limiting the opening stroke of the sealing member. The abutment of the male element under pressure is fixed and positioned in such a way that the sealing member engages the abutment when the male and female elements are connected. The abutment of the female element is mounted in a sliding manner to enable the abutment to occupy a fixed forward position.

The sealing member of the female element engages the abutment in the female element when the male and female elements are connected and moves the abutment rearward in order to allow a rearward movement of the sealing member beyond the opening stroke. The distance of the rearward movement substantially corresponds to the opening stroke of the male sealing member. The coupling furthermore includes means for locking and returning the sliding abutment in the forward position, which means permits the rearward movement of the sliding abutment during connection of the male and female elements and locking the sliding abutment in the forward position once such connection has been accomplished.

The coupling according to the invention is of the type where the female element equipped with the sliding abutment includes a sliding sleeve which is located rearward from the valve and includes an abutment upon which the means for locking and returning the abutment to the forward position acts.

According to the invention:

such sliding sleeve is substantially tubular and the abutment is formed by the front end surface of such sleeve, and the sliding abutment includes a second sliding sleeve located in front of the first sleeve and having an external diameter which corresponds to the internal diameter of the body, except for clearance. The front end of the second sleeve forms the valve sealing member and, directly behind such sealing member, includes flow-through holes for fluid. The rear end surface of the second sleeve is shaped for engagement with the front end surface of the first sleeve.

The two sleeves have a relatively simple structure and are inexpensive to manufacture.

The sleeves and the return spring of the sealing member are mounted in the body of the female element simply by inserting them and sliding them into the body.

The flow of the fluid through these sleeves is not significantly disturbed.

The sealing member also forms an integral part of the second sleeve and is perfectly guided within the body of the coupling so as to ensure good resistance of the valve to high pressures.

Preferably, the flow-through holes in the second sleeve for the fluid are oriented at an angle in the direction of the exterior to optimize flow.

The invention is further explained below with reference to the attached schematic drawings illustrating a preferred embodiment of the coupling according to the invention.

DETAILED DESCRIPTION

Figure 1:
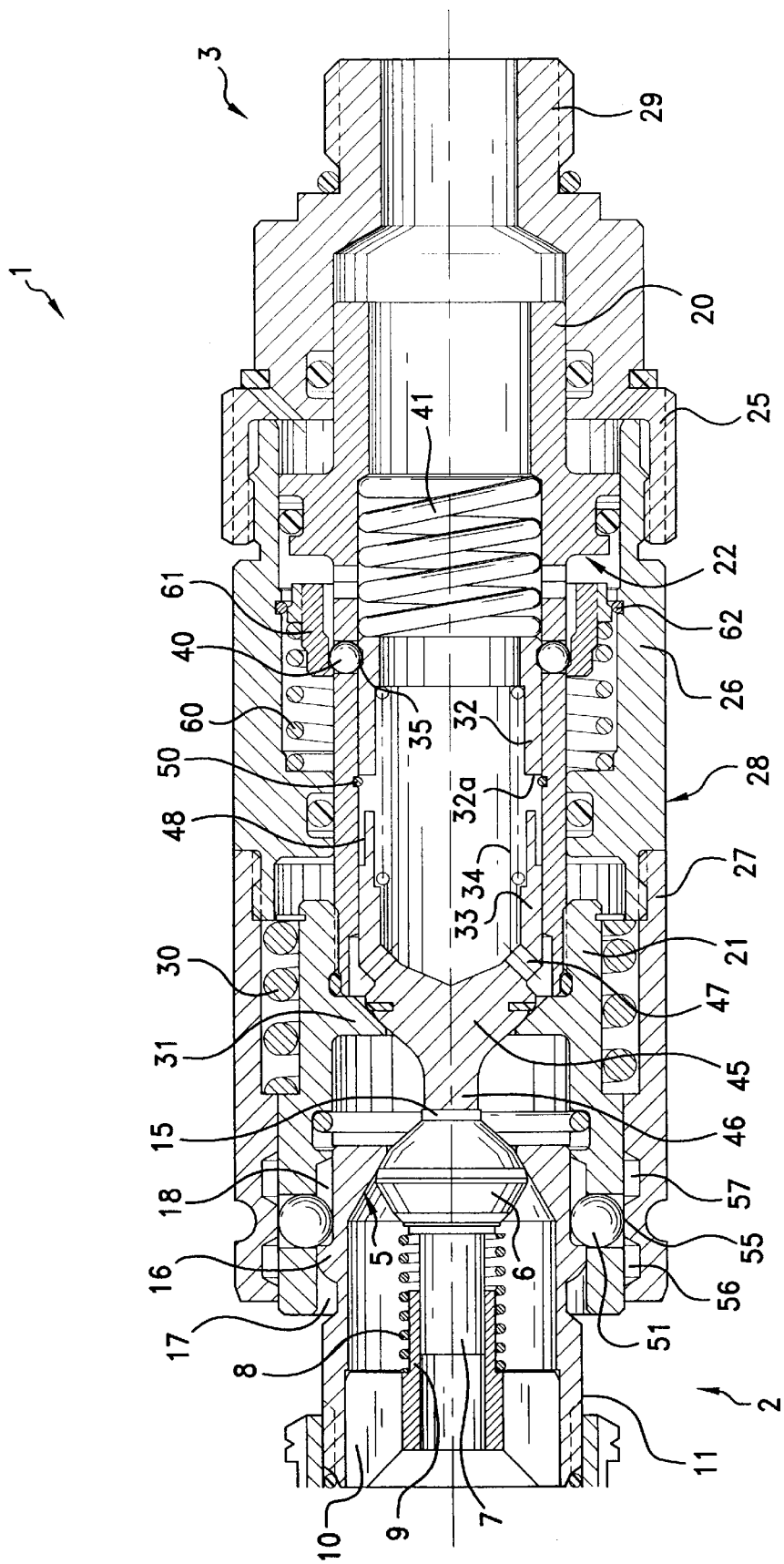
FIG. 1 is a longitudinal section of the quick-connect coupling of the present invention, illustrating the coupling in a first connecting position, where the male and female element are initially connected and both elements are closed.

FIGS. 1–4 illustrate a quick-connect coupling 1 for pressurized fluid lines which permits connection of such lines while pressurized fluid remains in one of the lines.

Such coupling comprises a male element 2 and a female element 3. The connecting ends of both the male element and female element are closed off by valves. The valve of the male element 2 comprises a seat 5, a sealing member 6 which is extended on its interior by a guide rod 7, a return spring 8 pressing such sealing member 6 against seat 5, and an internal tubular part 9 which is fixed in position and receives rod 7. Rod 7 slides within tubular part 9. Tubular part 9 includes radially-extending walls 10 engaging with body 11 of male element 2, and which define openings for the fluid to flow through male element 2.

Figure 4:
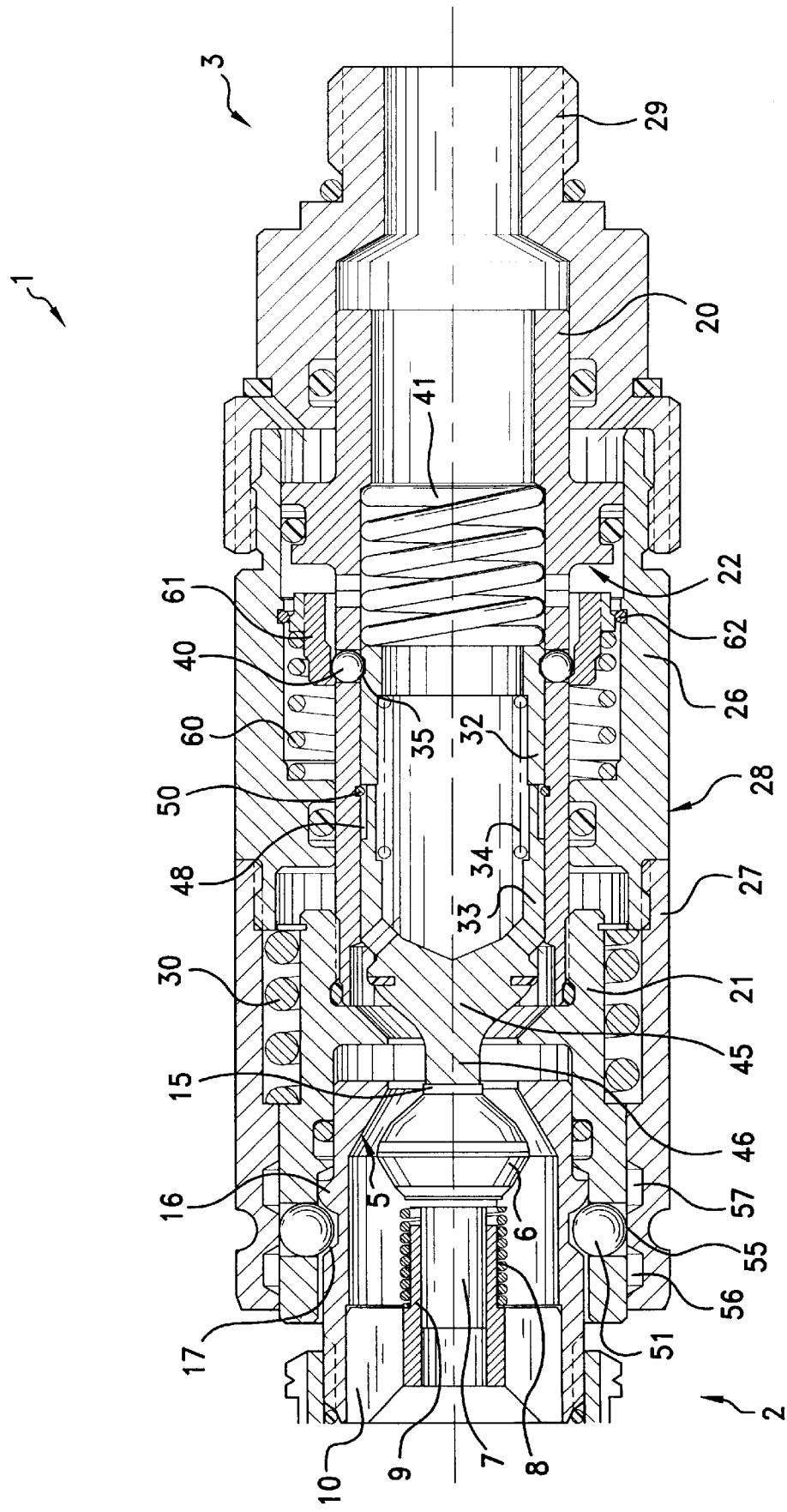
FIG. 4 is a longitudinal section of the quick-connect coupling of the present invention, illustrating the coupling in a fourth connecting position, where the male and female element are fully connected and both elements are open.

The front end of tubular part 9 forms a fixed abutment which engages the rear face of sealing member 6. Such abutment limits the opening stroke of sealing member 6 and is positioned in such a way that said sealing member 6 engages with the abutment when male element 2 and female element 3 are fully connected and in the fully open position as shown in FIG. 4.

On the exterior, sealing member 6 comprises a cylindrical nipple 15 which engages with the sealing member of the other valve when male element 2 and female element 3 are connected. Male element 2 also includes an exterior annular projection 16 with inclined side faces defining two grooves 17 and 18.

Female element 3 includes two assembled parts 20, 21 which form an interior body 22 containing the valve of female element 3 and three assembled parts 25, 26, 27 which form an exterior sleeve 28 and a connecting end 29 to the fluid line.

The interior body 22 is movable and slides with respect to the exterior sleeve 28, with a spring 30 inserted between the two. Such spring 30 normally holds interior body 22 and exterior sleeve 28 in the relative position shown in FIG. 1.

The valve of female element 3 includes a seat formed by an annular projection 31, a sliding abutment consisting of first and second sliding sleeves 32, 33 in body 22 having external diameters which correspond to the internal diameter of body 22, except for clearance, and a spring 34 inserted between sleeves 32, 33.

Rear sleeve 32 is substantially tubular. Sleeve 32 includes a front abutment surface 32a, an internal shoulder to receive one end of spring 34, and an external groove 35 with inclined lateral faces to receive balls 40. Such balls 40 are engaged in radial bores made in the wall of body 22 and are radially movable in such bores between an interior position illustrated in FIGS. 1, 2 and 4 and an exterior position shown in FIG. 3. The rear wall of sleeve 32 rests against a return spring 41, which in turn pushes against a shoulder formed in body 22.

Front sleeve 33 is located forwardly of sleeve 32. The front end of sleeve 33 forms a valve sealing member 45. A cylindrical nipple 46 extends forwardly from the front end of sealing member 45. Holes 47 are provided in sleeve 33 directly behind sealing member 45. Holes 47 are angled exteriorly (outwardly from rear to front) to enable the fluid to flow through sleeve 33. The rear end surface of sleeve 33 is shaped for engagement with front end surface 32a of sleeve 32. The rear end of sleeve 33 includes an internal shoulder receiving spring 34 and an external annular recess 48.

Between the two sleeves 32, 33, body 22 includes a retaining ring 50 which is inserted and held in a groove.

Internal body 22, at the level of its cavity intended to receive male element 2, includes balls 51 engaged in radial bores made in the walls of body 22. Such balls 51 are radially moveable within these bores between an interior position shown in FIGS. 1, 3 and 4 and an exterior position shown in FIG. 2. Exterior sleeve 28, at the height of such balls 51, includes an interior annular projection 55 with inclined side faces defining two grooves 56 and 57.

Interior body 22 and exterior sleeve 28 are formed such that they define between them an annular space to receive a spring 60, a coupling ring 61 with an internal conical shoulder and an external annual projection, and a retaining ring 62 inserted and held in the groove made in the internal face of sleeve 28.

Figure 2:
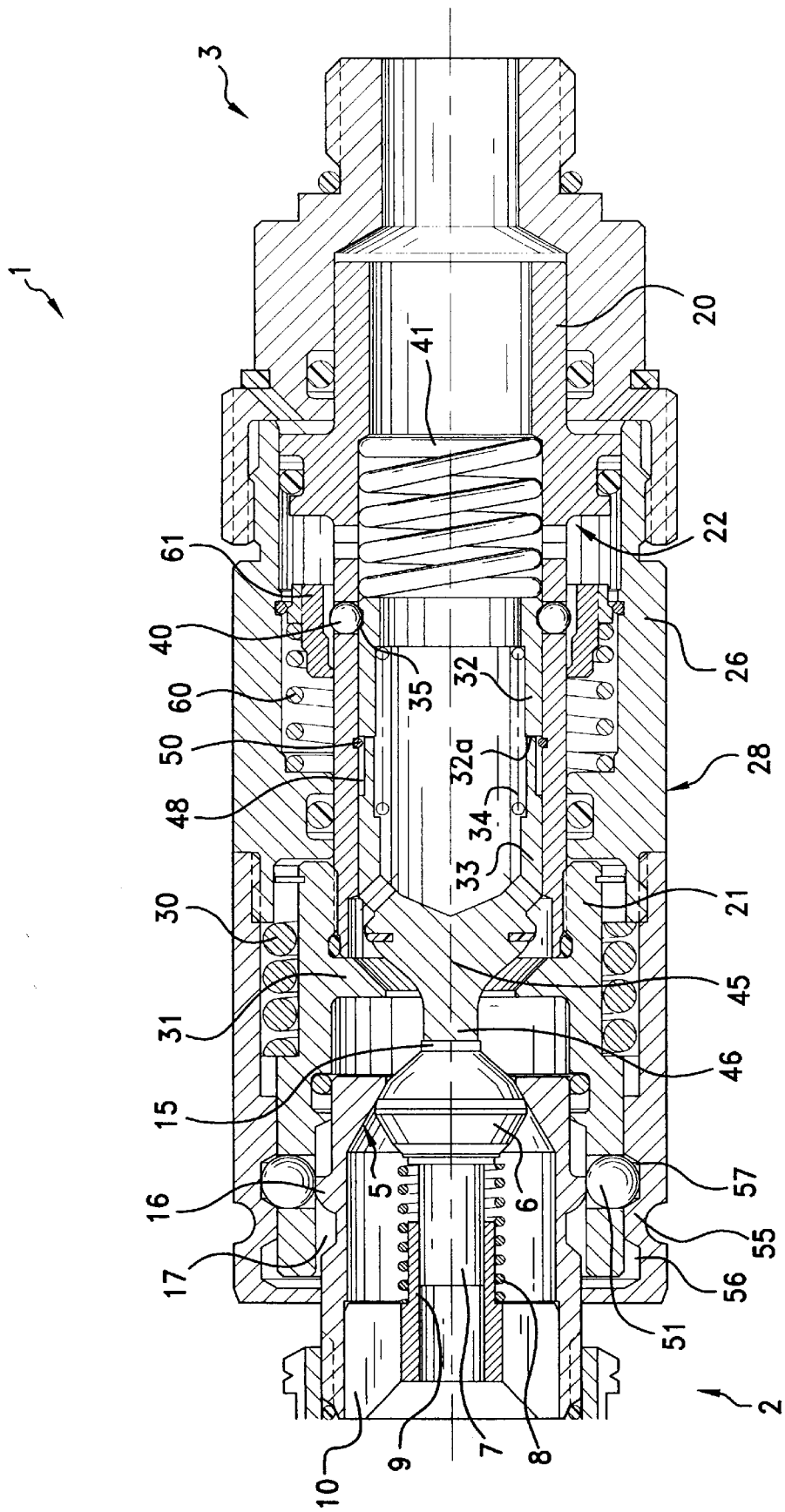
FIG. 2 is a longitudinal section of the quick-connect coupling of the present invention, illustrating the coupling in a second connecting position, where the male and female element are initially connected and the female element is open.
Figure 3:
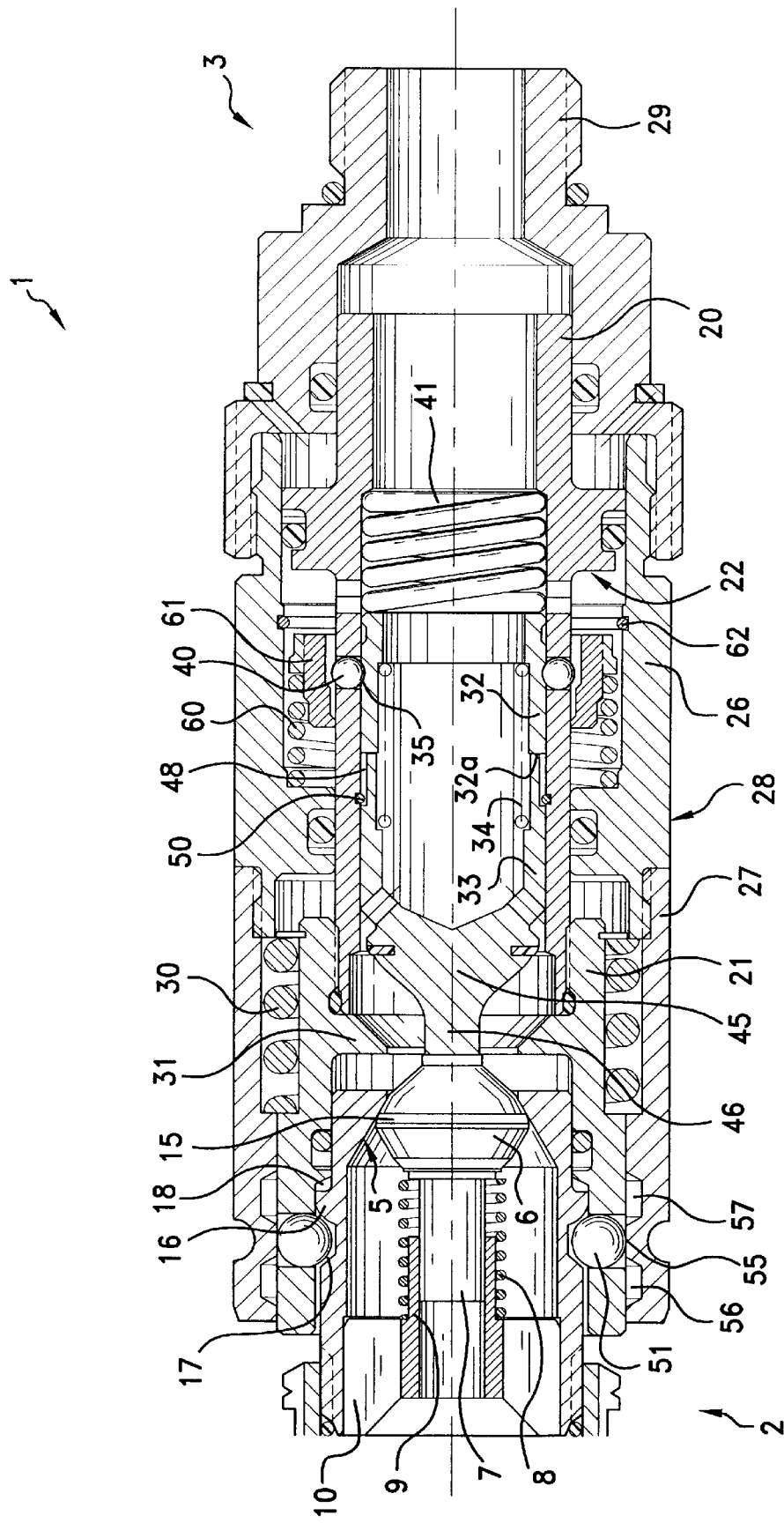
FIG. 3 is a longitudinal section of the quick-connect coupling of the present invention, illustrating the coupling in a third connecting position, where the male and female element are initially connected and the female element is open.

It is evident from the figures (i.e., FIGS. 1, 2 and 4) that such retaining ring 62 is shaped so as to engage with the annular projection of coupling ring 61 and to displace the coupling ring against spring 60 during connection. It is furthermore evident that coupling ring 61 and its conical shoulder are shaped such that, depending on their position, they either keep balls 40 in their interior position as shown in FIGS. 1 and 4; permit the displacement of balls 40 toward their exterior position as shown in FIG. 2; or push balls 40 toward the interior of body 22 (i.e., toward the central axis of the body) as shown in FIG. 3.

FIG. 1 shows male element 2 and female element 3 at the start of the connection process when male element 2 is inserted into the cavity of female element 3. Male element 2, which is connected to the tool that is actuated by the fluid, generally contains pressurized fluid; while female element 3, which is connected to the fluid source, is not under pressure. Coupling ring 61 locks balls 40 into their innermost position in which such balls are engaged in groove 35 of sleeve 32.

During engagement of male element 2, projection 16 encounters balls 51 which are kept in an innermost position by opposing projection 55 in sleeve 28. At the same time, nipple 15 of sealing member 6 contacts the corresponding nipple 46 of sealing member 45.

The continued engagement of male element 2 causes interior body 22 to be displaced toward the right of the figure (rearwardly) in relation to the exterior sleeve 28. Such displacement causes springs 30 and 60 to be compressed and balls 40 to be displaced beyond the conical shoulder of coupling ring 61. Such displacement continues until balls 51 are facing groove 57 and are pushed into groove 57 by the inclined side face of projection 16.

Engagement of male element 2 can then continue with the effect that sealing member 45 is moved from its seat and causes front sleeve 33 to move rearward against spring 34. The rear end of front sleeve 33 engages with front surface 32a of rear sleeve 32 as shown in FIG. 2, and urges sleeve 32 rearward. Such rearward movement drives balls 40 from groove 35 and brings them to their outer position.

The rearward movement continues until the position shown in FIG. 3 is reached. In this position, male element 2 is completely engaged in the cavity of female element 3. Groove 17 faces balls 51 and balls 51 are driven into such groove 17 such as to lock male element 2 and female element 3. Spring 30 is released and returns internal body 22 and external sleeve 28 to their respective original position. Spring 60 is simultaneously released and brings the conical shoulder of coupling ring 61 to engage with balls 40 such as to push the latter toward the interior of body 22.

When the pressure is established in female element 3, the fluid displaces sleeves 32 and 33 toward the left of the figures until they reach the position illustrated in FIG. 4. In this position, groove 35 again faces balls 40 and balls 40 are driven into groove 35 by coupling ring 61. Ring 61 returns to its locking position of such balls 40.

The two valves are then open and the two sealing members 6 and 45 are fixed in position with sealing member 6 abutting against tubular part 9, and sleeve 33 engaged with sleeve 32.

Male element 2 and female element 3 are disconnected by exerting a pull force on the male element which displaces interior body 22 toward the left until balls 51 pass into groove 56.

As should be apparent from the above, the two sleeves 32, 33 have a relatively simple structure and are not costly to manufacture.

Sleeves 32, 33 and return spring 34 are mounted in body 22 simply by inserting and sliding them into body 22. Retaining ring 50 ensures installation of the sleeve 32 and spring 41 in tubular part 20. Spring 34 and sleeve 33 are then positioned before part 20 and part 21 are assembled. Recess 48 permits sleeve 33 to draw back beyond retaining ring 50.

Fluid flowing through sleeves 32, 33 is not disturbed, and the oblique orientation of holes 47 permits optimization of such flow.

Sealing member 45 forms an integral part of sleeve 33 and is perfectly guided within body 22, thus ensuring good resistance of the valve to high pressures.

Spring 9 is advantageously stiffer than spring 34 but less stiff than spring 41 such that, if there is no pressure within male element 2, the two valves open without any rearward movement of sleeve 32.

The principles, preferred embodiments and modes of operation of the present invention have been described in the foregoing specification. The invention which is intended to be protected herein should not, however, be construed as limited to the particular form described as it is to be regarded as illustrative rather than restrictive. Variations and changes may be made by those skilled in the art without departing from the scope and spirit of the invention as set forth in the appended claims.

What is claimed is:

1. A quick-connect coupling for pressurized fluid lines permitting the connection of such lines while pressurized fluid remains in one of the lines, such coupling including a male element and a female element whose connecting ends are each closed off by valves; each valve including a body enclosing a sealing member which engages with the sealing member of the other valve during connection, a return spring pushing the sealing member against a seat, and an abutment limiting the opening stroke of the sealing member; the abutment of the element under pressure fixed and positioned in such a way that the sealing member engages with the abutment when the male and female elements are connected; the other abutment mounted in the other element in a sliding manner to enable the other abutment to occupy a fixed forward position in which the associated sealing member engages with the other abutment when the male and female elements are connected and to move rearward within the element in order to allow the sealing member associated with the sliding abutment to move rearward, with the distance of the rearward movement substantially corresponding to an opening stroke of the sealing member associated with the fixed abutment; further including means for locking and returning the sliding abutment to the forward position, said means permitting the rearward movement of the sliding abutment during connection of the male and female elements and the locking of the sliding abutment into its forward position once such connection is complete; the sliding abutment including a first sliding tubular sleeve, located rearward of the valve of the element, upon which said means for locking and returning the abutment to the forward position acts, and a second sliding sleeve located forwardly of the first sleeve and having an external diameter which corresponds substantially to an internal diameter of the body, with the front end of said second sleeve forming the valve sealing member of the sliding abutment and including holes located directly behind such sealing member enabling fluid to flow through the body, and with a rear end of said second sleeve being shaped for engagement with the first sleeve.

2. The coupling in accordance with claim 1, wherein the holes in the second sleeve are oriented at an angle to a central axis of the second sleeve.

3. The coupling in accordance with claim 1, wherein the first sleeve includes an external groove with inclined side faces which is capable of receiving balls engaged in radial bores formed in the walls of the body, said balls being radially movable within such bores between an interior position and an exterior position, and further including a outer spring surrounding the body, a coupling ring biased by said outer spring and provided with an internal conical shoulder and an external annular projection, and a retaining ring which is inserted and retained in a groove made in the internal face of an exterior sleeve surrounding the body, said retaining ring being shaped so as to engage with the annular projection of the coupling ring and displace the coupling ring against the outer spring during connection, said coupling ring retaining the balls in the interior position in which such balls are engaged in said groove of the first sleeve, and allowing the displacement of the balls to their exterior position, depending upon the relative position of the coupling ring relative to the body.

4. The coupling in accordance with claim 3, wherein the return spring of the element under pressure is stiffer than the return spring of the other element, but less stiff than the outer spring surrounding the body.

5. A quick-connect coupling for pressurized fluid lines, such coupling including a male element and a female element whose connecting ends are each closed off by valves; each valve including a body enclosing a sealing member which engages with the sealing member of the other valve during connection, and a return spring pushing the sealing member against a seat, one of the elements including an abutment limiting the opening stroke of the sealing member; the abutment mounted in the one element in a sliding manner to enable the abutment to occupy a fixed forward position in which the associated sealing member engages with the abutment when the male and female elements are connected and to move rearward within the element in order to allow the sealing member associated with the sliding abutment to move rearward, with the distance of the rearward movement substantially corresponding to an opening stroke of the sealing member associated with the other element; further including locking balls which permit the rearward movement of the sliding abutment during connection of the male and female elements and the locking of the sliding abutment into its forward position once such connection is complete; the sliding abutment including a first sliding tubular sleeve, located behind the valve in the one element, which is engaged and retained by the locking balls, and a second sliding sleeve located forwardly of the first sleeve and having an external diameter which corresponds substantially to an internal diameter of the body, with the front end of said second sleeve forming the valve sealing member of the sliding abutment and including holes located directly behind such sealing member enabling fluid to flow through the body, and with a rear end of said second sleeve being shaped for engagement with a front end of the first sleeve.

* * * * *